Jan. 31, 1967 W. H. SLAVIK 3,302,055
DYNAMIC PINCUSHION DISTORTION CORRECTION FOR TELEVISION RECEIVERS
Filed Feb. 25, 1964
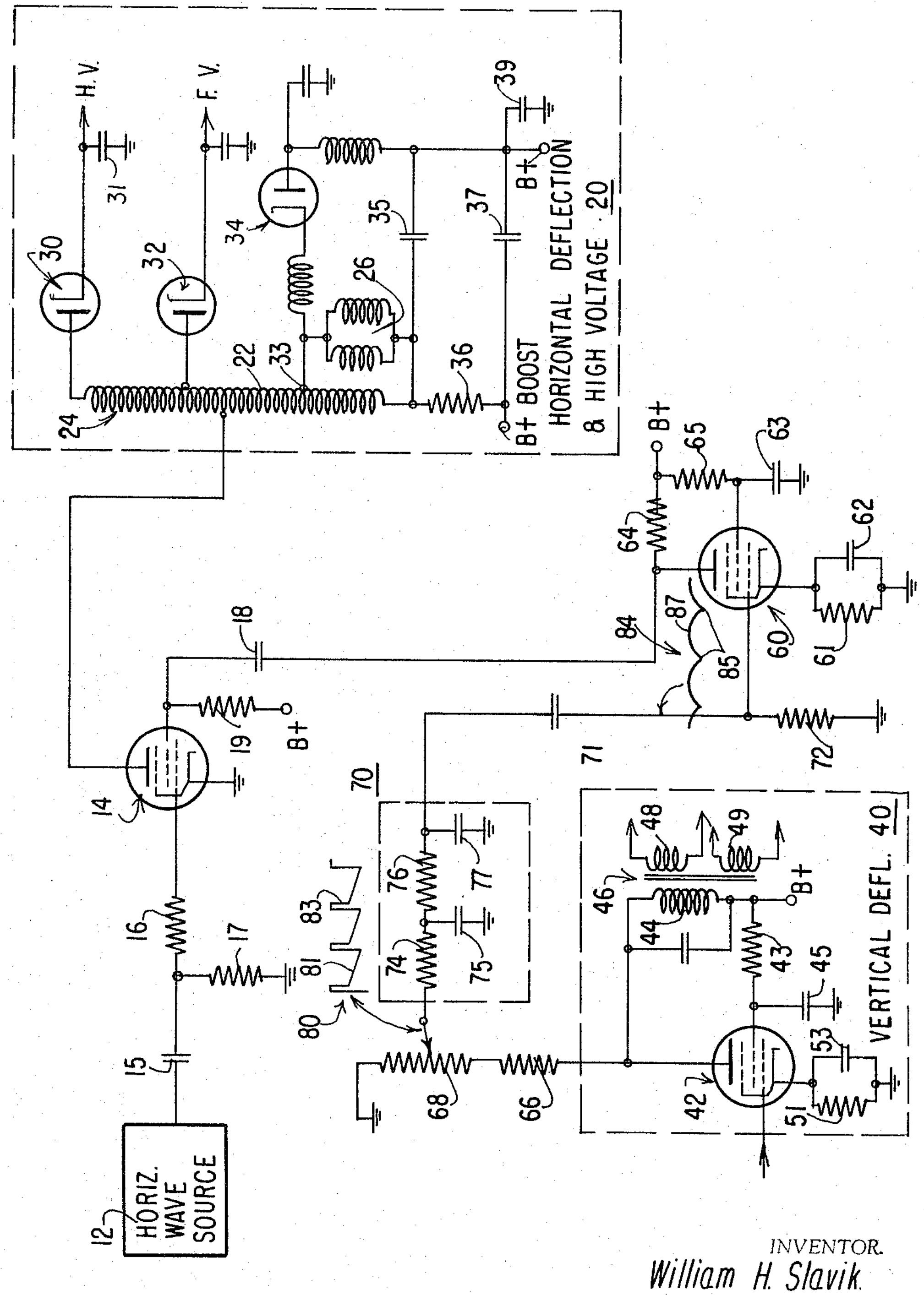
INVENTOR.
William H. Slavik
BY
Mueller & Aichele
Attys.

3,302,055
DYNAMIC PINCUSHION DISTORTION CORRECTION FOR TELEVISION RECEIVERS

William H. Slavik, Chicago, Ill., assignor to Motorola, Inc., Franklin Park, Ill., a corporation of Illinois Filed Feb. 25, 1964, Ser. No. 347,253
4 Claims. (Cl. 315—24)

This invention relates generally to deflection systems for color television receivers, and more particularly to circuit improvements for providing dynamic correction of pincushion distortion on the sides of the raster of the viewing screen of the cathode ray tube.

The use of wide deflection angle cathode ray tubes that have a relatively flat rectangular viewing screen results in a distortion of the raster of the type known as pincushion distortion. Such distortion is usually corrected in black and white receivers by modifying the deflection yokes to provide non-symmetrical sweep when substantial linear saw-tooth waves are applied thereto. However, with the relatively complicated deflection system of tri-gun cathode ray tubes of the type used in color television receivers it is desirable to avoid introducing any non-symmetrical convergence errors, and essentially linear-field yokes are preferable. This requires that pincushion distortion be corrected by modifying the waves generated in the deflection systems rather than by modification of the yoke structure.

A number of circuits have been proposed to correct for raster distortion in multi-beam cathode ray tubes that require substantially linear deflection field by dynamically varying one deflection wave with a signal derived from the other deflection wave. In the instance of distortion on the sides of the raster, the horizontal deflection wave may be made to scan at different widths in response to a shaped wave, such as a parabola, derived from the vertical deflection system. In most instances circuits of this nature are relatively complex and have produced less than satisfactory results.

For example, the input power required for the deflection systems of the tri-gun cathode ray tubes used in color television receivers places heavy demands on the horizontal deflection output tube, and is desirable to operate the tube in a manner that allows zero grid bias to be reached at the end of horizontal scan. Otherwise higher screen voltage is required and greater screen dissipation results for the same plate current.

Modification of the input by direct application of a parabolic wave to the control grid of the horizontal output tube results in zero grid bias at the middle of horizontal scan, with increased dissipation and a loss of efficiency. And since the horizontal output tube is normally operated near the knee of its operating curve variations in D.C. screen voltage by direct application of a parabolic wave results in very little change in horizontal scan width.

It is accordingly an object of the present invention to provide an improved circuit for dynamic correction of the pincushion distortion on the sides of a raster of the viewing screen of a cathode ray tube.

Another object of the invention is to provide an improved circuit to reduce pincushion distortion on the sides of the raster of a cathode ray tube by dynamically modifying the horizontal deflection waves so that linear field deflection yokes may be used with the multi-gun cathode ray tubes of color television receivers.

A further object of the invention is to provide a horizontal dynamic pincushion correction system which is simple in construction and reliable in operation, and which does not substantially increase dissipation of the horizontal output tube of the receiver.

More specifically, the input power to the horizontal deflection system of a television receiver is dynamically varied by a wave derived from the vertical deflection system to cause a change in horizontal scan width during vertical scan, thus correcting for pincushion distortion on the sides of the raster. In one form the alternating current impedance path from the screen grid to ground, and thus the alternating current signal component appearing at the screen grid of the horizontal output tube, is varied by a wave derived from the vertical deflection system. This in turn produces degeneration that results in variations of the power supplied to the horizontal deflection system to provide the desired correction of horizontal scan width. A capacitor is coupled between the screen grid of the horizontal output tube to the anode of a modulating tube which functions as a variable impedance element. The modulating tube is driven with a parabolic wave derived from the vertical deflection system of the receiver to provide an electronically variable impedance in the alternating current path to ground for the screen grid of the horizontal output tube. The impedance presented by the modulating tube is high at the top and bottom of the raster and low at the center of the raster so that the horizontal scan width is greater at the center of the raster than at the top and bottom.

The accompanying drawing is a schematic diagram of portions of a television receiver embodying the invention.

Referring now to FIG. 1, horizontal deflection wave source 12 provides 15.75 kc. horizontal deflection waves that are fed to the control grid of horizontal output tube 14 by an input network including coupling capacitor 15, isolating resistor 16 and grid-leak resistor 17. D.C. screen grid voltage for tube 14 is supplied from B+ through dropping resistor 19. The cathode of tube 14 is returned to ground reference potential in the usual manner. The screen grid of tube 14 is further coupled by capacitor 18 to a modulating tube which varies the A.C. impedance of this point to ground reference potential in the manner to be subsequently described. It is to be understood that in the usual instance the screen grid of tube 14 would be provided with an A.C. bypass directly to ground reference potential.

The anode of horizontal output tube 14 is connected to tap point 22 on autotransformer 24. This connection energizes autotransformer 24 with the output of tube 14 to supply deflection waves to horizontal deflection and high voltage system 20, and further provides means to supply B+ to the anode of tube 14 to autotransformer 24. As is the usual practice autotransformer 24 is tapped at successive points to provide the second anode and focusing voltages for the cathode ray tube of the receiver, B+ boost, and further supplies horizontal deflection waves to the horizontal deflection yokes represented by windings 26. It is to be understood that deflection yokes are located on the neck of the cathode ray tube to cause horizontal scanning of the electron beam when autotransformer 24 is energized with the output of tube 14 at tap point 21.

To provide second anode voltage the anode of half-wave rectifier 30 is connected to the top of autotransformer 24 to receive a large step-up in voltage. High amplitude fly-back pulses produced in autotransformer 24 are rectified by diode 30 and the second anode voltage for the cathode ray tube of the receiver is developed across capacitor 31, connected between the cathode of rectifier 30 and ground reference potential. A further half-wave rectifier 32 is provided at a lower voltage tap point on autotransformer 24 to provide the focusing voltage for the cathode ray tube in the same manner.

Damper diode 34 is connected between a further tap point 33 on autotransformer 24 and the B+ supply of the receiver in the conventional manner. Bootstrap capacitor 35 is also coupled between B+ and the bottom end of auto-transformer 24, which point is returned to B+ by decoupling resistor 36 and filter capacitor 37. Capacitor 39 provides a further bypass for B+ to ground reference potential. This circuit arrangement provides a bootstrap circuit, as it is known in the art, so that a filtered B+ boost potential may be derived at the junction point between resistor 36 and capacitor 37.

The vertical deflection system 40 of the receiver includes an output stage having tube 42 for supplying vertical deflection waves to primary winding 44 of vertical output transformer 46. Vertical output tube 42, for example, may be one-half of a plate-couple multivibrator for generating sawtooth waves at the desired vertical scan rate. Circuits of this type are known in the art and in detail form no part of the invention. Secondary windings 48 and 49 of vertical output transformer 46 apply the output of tube 42 to the vertical deflection and convergence circuits to the receiver. Anode voltage is supplied to tube 42 from B+ through primary winding 44, while dropping resistor 43 supplies screen grid voltage from B+. The screen grid of tube 42 is bypassed by capacitor 45. The cathode of tube 42 is returned to ground reference potential by resistor 51, bypassed by capacitor 53.

As has been noted, and in accordance with the present invention, one end of capacitor 18 is connected to the screen grid of horizontal output tube 14. The other end of capacitor 18 is returned to ground reference potential through the variable impedance provided by modulating tube 60. To this end, capacitor 18 is connected to the anode of tube 60, while the cathode of tube 60 is returned to ground reference potential by resistor 61. Capacitor 62 provides a bypass for resistor 61 for signals of horizontal deflection frequency (15.75 kc.). B+ is supplied to tube 60 through load resistor 64. Load resistor 64 is preferably of a large value to present a high impedance when tube 60 is non-conducting. Screen grid voltage for tube 60 is supplied from B+ through dropping resistor 65, and bypassed by capacitor 63.

The anode of vertical output tube 42 is returned to ground reference potential by a voltage dividing arrangement including resistor 66 and potentiometer 68. A double integrator network 70 is connected between the tap point of potentiometer 68 and the grid electrode of tube 60 by coupling capacitor 71. Resistor 72 returns the grid electrode of tube 60 to ground reference potential. Double integrator network 70 includes series resistor 74 and shunt capacitor 75, and series resistor 76 and shunt resistor 77.

In operation the vertical deflection wave appearing at the anode of tube 42, suitably divided down by resistor 66 and potentiometer 68, is supplied to the input of double integrator network 70. This wave, as illustrated by waveform 80, includes a negative going trace portion 81 and positive going retrace pulses 83. It is known that when such a wave is subjected to double integration a substantially parabolic wave is produced. The resulting parabolic wave, shown by waveform 84, has negative peaks 85 that occur at the top and the bottom of the raster and the positive going portion 87 which reaches a maximum at the center of the raster.

It can be seen from the foregoing that when parabolic wave 84 is applied to the control grid of tube 60, this tube can be cut off at the top and bottom of the raster and driven into conduction at intermediate points. Maximum conduction occurs at the center of the raster. Thus tube 60 presents a variable impedance in series with capacitor 18, between the screen grid of horizontal output tube 14 and ground reference potential. At the center of the raster this impedance is low and the screen grid of horizontal output tube 14 is effectively bypassed to ground reference potential. However, as tube 60 approaches cutoff provided by the negative peaks of parabolic wave 85 at the top and the bottom of the raster, the increased impedance in series with capacitor 20 develops a varying A.C. signal at the screen grid of tube 14 for intermediate points of the raster. Since this signal is in phase with the A.C. signal appearing at the anode electrode of tube 14, degeneration takes place and the output of tube 14 is reduced to provide a corresponding variation in horizontal scan width.

In a practically constructed circuit the following component values may be used:

| | | |
|---|---|---|
| Capacitor 18 | μf | .1 |
| Tube 60 | | 6CW5 |
| Resistor 61 | ohms | 1200 |
| Capacitor 62 | μf | 50 |
| Capacitor 63 | do | 5 |
| Resistors 64, 74 | ohms | 100,000 |
| Resistor 65 | do | 27,000 |
| Resistors 66, 72 | do | 470,000 |
| Potentiometer 68 | do | 250,000 |
| Capacitor 71 | μf | .05 |
| Capacitors 75, 77 | do | .015 |
| Resistor 76 | ohms | 560,000 |

The invention provides, therefore, an improved circuit for correction of pincushion distortion on the sides of a television raster to enable linear field deflection yokes to be utilized with multi-gun cathode ray tubes of the type used in color television receivers. The circuit is simple to construct and reliable in operation, and may be incorporated with conventional circuits used with color television receivers without any modifications thereof. It is not necessary, for example, to drive the horizontal output tube in a manner that increases dissipation.

I claim:

1. A circuit for dynamically correcting distortion on the sides of the raster produced by cathode ray tube, including in combination, a deflection circuit for developing horizontal deflection signals for sweeping a beam of the cathode ray tube, said deflection circuit including a first electron control device having first electrodes conducting current therein and developing the deflection signals, said electron control device further having a control electrode, a control circuit coupled to said control electrode for operating said deflection circuit at the horizontal deflection frequency, alternating current bypass circuit means coupled to one of said first electrodes of said first electron control device and including a further electron control device therein to change the bypassing of said one electrode in response to conductive variation of said further electron control device, a source of substantially parabolic waves occurring at the vertical deflection frequency of the raster of the cathode ray tube, and means coupling said source of substantially parabolic waves to said further electron control device to vary the conduction thereof.

2. Apparatus for dynamically correcting for distortion on the sides of the raster of the cathode ray tube of a television receiver, the combination including: a deflection circuit for applying horizontal deflection waves to the deflection windings of the cathode ray tube; a driver stage including an electron valve for energizing said horizontal deflection circuit, said electron valve having an anode electrode coupled to said horizontal deflection circuit, a control grid electrode for receiving horizontal deflection waves, and a screen grid electrode; a source of parabolic waves occurring at vertical deflection frequency; an alternating current impedance path including a variable impedance coupling said screen grid electrode to a reference potential; and circuit means coupled between said source of parabolic waves and said variable impedance to vary the impedance to said reference potential for said screen grid electrode, thereby dynamically changing the horizontal scan width of the raster during vertical deflection.

3. Apparatus for dynamically correcting for distortion on the sides of the raster of the cathode ray tube of a television receiver, the combination including: a deflection circuit for applying horizontal deflection waves to the deflection windings of the cathode ray tube; a driver stage for energizing said deflection circuit with horizontal deflection waves, said driver stage including a first electron valve having an anode electrode coupled to said deflection circuit, a control grid electrode for receiving horizontal deflection waves, and further having a screen grid electrode; a second electron valve having anode, cathode and control grid electrodes, with said cathode electrode of said first electron valve coupled to ground reference potential; a vertical deflection circuit including a third electron valve providing vertical deflection waves at the anode electrode thereof; a capacitor coupled between the screen grid electrode of said first electron valve and the anode electrode of said second electron valve; and wave-shaping circuit means coupled between the anode electrode of said third electron valve and the control grid of said second electron valve to apply a parabolic wave at vertical deflection frequency thereto, with said second electron valve operable to vary the impedance to ground reference potential for the screen grid electrode of said first electron valve in response to said parabolic wave; thereby to dynamically change horizontal scan width of the raster during vertical deflection.

4. Apparatus of claim 3 wherein said wave-shaping circuit means includes means to provide double integration of the wave derived from the anode electrode of said third electron valve, thereby to apply a parabolic wave having negative going peaks occurring at the top and bottom of vertical scan of the raster to the control grid of said second electron valve.

References Cited by the Examiner

UNITED STATES PATENTS 2,758,248 8/1956 Garrett ------------- 315—27

ROBERT L. GRIFFIN, *Primary Examiner.*

T. A. GALLAGHER, *Assistant Examiner.*